(12) United States Patent
Blouin et al.

(10) Patent No.: US 7,765,683 B2
(45) Date of Patent: Aug. 3, 2010

(54) ROTOR TO STATOR TEMPORARY INTERCONNECTION ELEMENT FOR BEARINGLESS ELECTRIC MACHINE

(75) Inventors: Pierre Blouin, Boucherville (CA); Éric Latulipe, Sainte-Julie (CA)

(73) Assignee: TM4 Inc., Boucherville, Quebec (CA)

(*) Notice: Subject to any disclaimer, the term of this patent is extended or adjusted under 35 U.S.C. 154(b) by 389 days.

(21) Appl. No.: 11/574,033

(22) PCT Filed: Aug. 30, 2005

(86) PCT No.: PCT/CA2005/001326

§ 371 (c)(1),
(2), (4) Date: Jun. 25, 2007

(87) PCT Pub. No.: WO2006/024162

PCT Pub. Date: Mar. 9, 2006

(65) Prior Publication Data

US 2009/0031555 A1     Feb. 5, 2009

(51) Int. Cl.
*H02K 15/00* (2006.01)
(52) U.S. Cl. .......................... 29/732; 29/428; 29/596; 29/598; 310/91; 310/112
(58) Field of Classification Search .................. 29/598, 29/428, 464, 559, 596, 732, 822, 889.2; 310/89–91, 310/112, 266
See application file for complete search history.

(56) References Cited

U.S. PATENT DOCUMENTS

| 4,286,187 A | 8/1981 | Binder |
| 4,586,225 A | 5/1986 | Bouiller et al. |
| 5,174,614 A | 12/1992 | Kaleniecki |
| 5,577,775 A | 11/1996 | Pearson et al. |

FOREIGN PATENT DOCUMENTS

WO          00 / 71888          11/2000

OTHER PUBLICATIONS

Stamford User Manuel, "Installation, Service & Maintenance Manuel for AC Generators with Prefix MV734", 2002,36 sheets.
Danaher Motion Manuel, "Rotary Direct Drive Motor Cartridge DDR", 2004, 6 sheets.

*Primary Examiner*—Thiem Phan
(74) *Attorney, Agent, or Firm*—Fay Kaplun & Marcin, LLP

(57) ABSTRACT

A temporary interconnection element to be installed between the rotor and the stator of a bearingless electric machine, for example during its transport, storage or assembly is described herein. The interconnection element is so designed that the rotor may be secured to an external assembly, such as for example the shaft of an internal combustion engine, before the element is removed from its interconnection position.

19 Claims, 7 Drawing Sheets

FIG_3

FIG_4

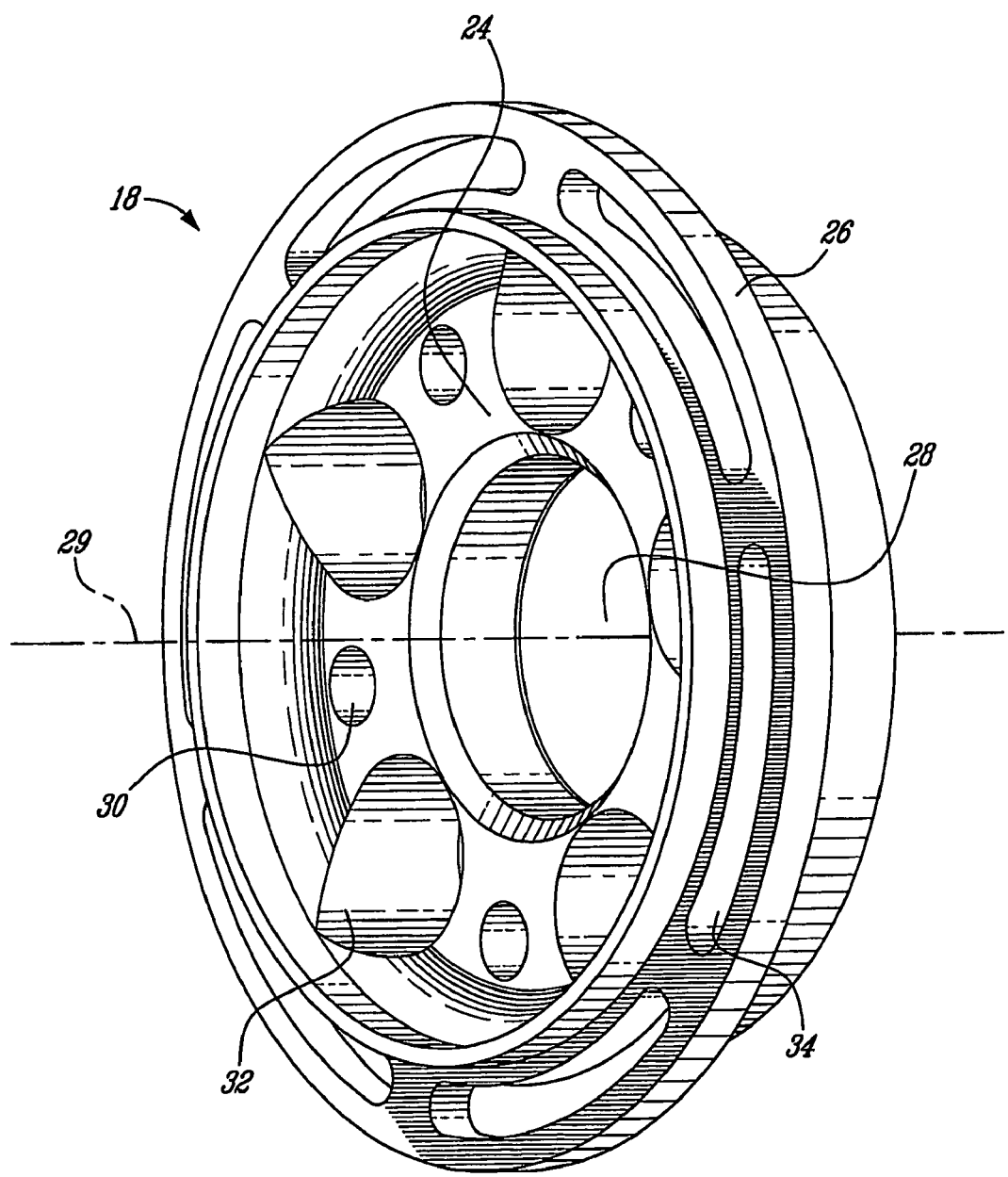
FIG_7

ROTOR TO STATOR TEMPORARY INTERCONNECTION ELEMENT FOR BEARINGLESS ELECTRIC MACHINE

FIELD OF THE INVENTION

The present invention relates to electric machines. More specifically, the present invention is concerned with a temporary interconnection element to be mounted between a rotor and a stator of a bearingless electric machine.

BACKGROUND OF THE INVENTION

Electric machines are well known in the art. They are used to transform mechanical energy to electrical energy or vice versa by means of two coaxial generally cylindrical bodies: a first one being fixed: the stator, the other one being coaxially rotatable relative to the other, the rotor.

Some electric machines are self-supportive in that they include bearings or other frictionless elements to rotatably mount the rotor to the stator, while others, which are referred to as bearingless electric machines, do not include any means to support the rotor with respect to the stator. They are often used when the rotor is mounted to a drive shaft that is axially and radially fixed. For example, when an electric generator is directly mounted to an ICE (Internal Combustion Engine), i.e. when the stator is secured to the casing of the ICE and when the rotor is secured to the driving shaft of the ICE.

However, the transport of bearingless electric machines is problematic since there is no bearing to maintain the spatial relationship between the rotor and the stator of the machine. For the same reason, the installation and removal of the bearingless machine to/from an ICE for example is also problematic. These problems are compounded when the electric machine is of the permanent magnet type.

OBJECTS OF THE INVENTION

An object of the present invention is therefore to provide a temporary interconnection element between the rotor and the stator of an electric machine, for example during the transport, storage and installation of a bearingless electric machine to an external assembly, such as the shaft of an ICE.

SUMMARY OF THE INVENTION

More specifically, in accordance with the present invention, there is provided an interconnection element for temporary rotor to stator interconnection, the rotor and stator being intended for use in a bearingless electric machine, the element comprising: a first anchoring portion to be removably secured to the rotor; a second anchoring portion to be removably secured to the stator; and at least one passage extending through the element for fastening the rotor to a shaft.

More specifically, there is provided an interconnection element for temporary rotor to stator interconnection, the rotor and stator being intended for use in a bearingless electric machine, the element being generally in the form of a disc, comprising: a recessed central portion defining a first anchoring portion to be removably secured to the rotor and including passages extending through the element for fastening the rotor to an external element without removal of the element; and a peripheral flange defining a second anchoring portion to be removably secured to the stator.

According to a second aspect of the present invention, there is provided a bearingless electric machine including: a stator; a rotor; an interconnection element for temporary interconnecting the rotor and the stator; the interconnection element allowing the rotor to be connected to an external assembly without requiring removal thereof.

Finally, according to a third aspect of the present invention, there is provided a process for mounting a bearingless electric machine provided with a rotor and a stator to a working machine provided with a rotatable shaft, the process comprising: using a temporary interconnection element for interconnecting the rotor and stator of the bearingless electric machine; securing the rotor of the bearingless electric machine to the rotatable shaft of the working machine; and releasing the temporary interconnection element from at least one of the rotor and stator.

Other objects, advantages and features of the present invention will become more apparent upon reading the following non restrictive description of preferred embodiments thereof, given by way of example only with reference to the accompanying drawings.

BRIEF DESCRIPTION OF THE DRAWINGS

In the appended drawings:

FIG. 7 is a perspective view of the temporary interconnection element according to an embodiment of the present invention.

DETAILED DESCRIPTION

Generally stated, an embodiment of the present invention relates to a temporary interconnection element to be installed between the rotor and the stator of a bearingless electric machine, for example during its transport or storage. The interconnection element is so designed that the rotor may be secured to an external assembly, such as for example the shaft of an ICE (Internal Combustion Engine), while the element remains in its interconnection position.

Figure 1:
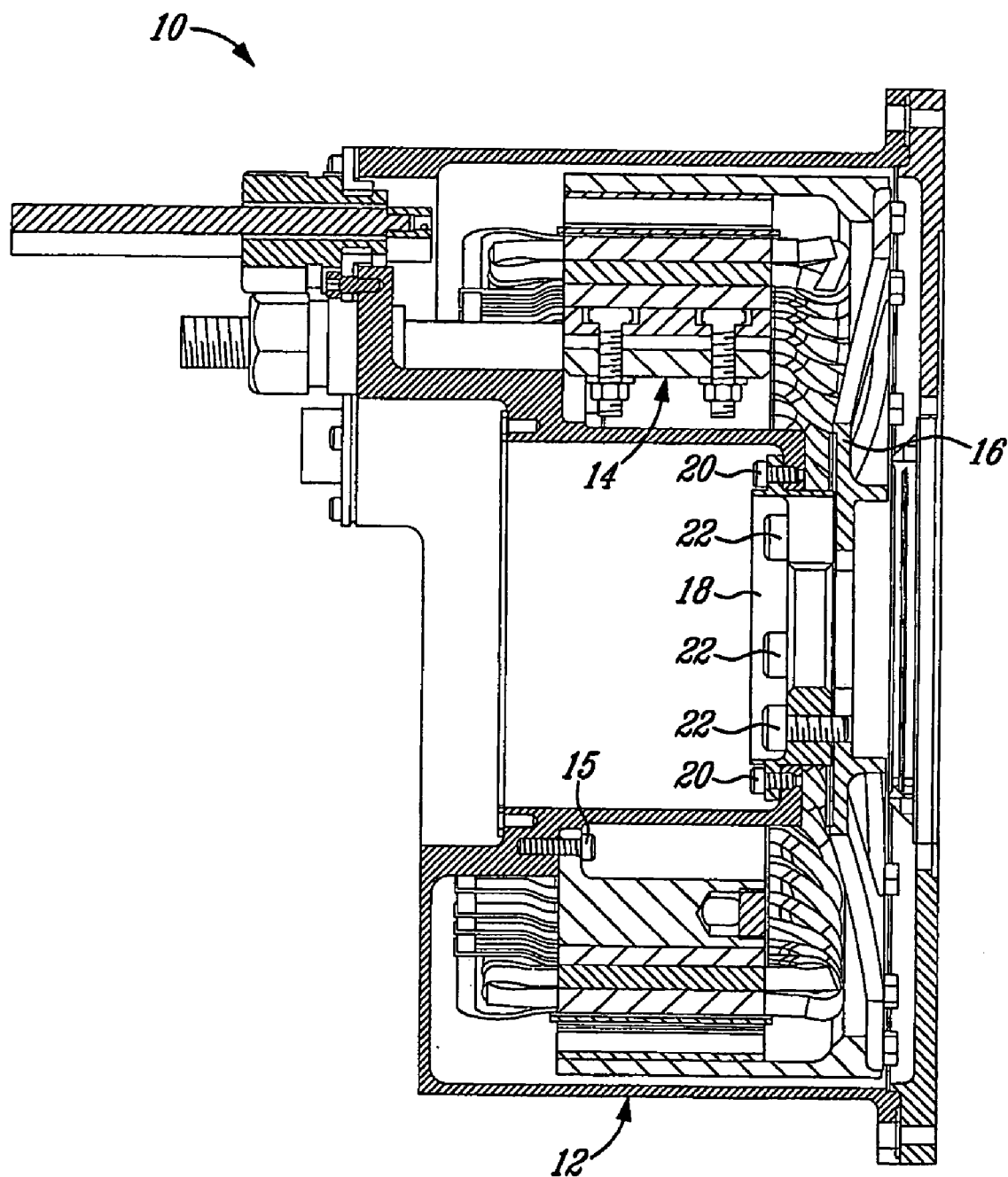
FIG. 1 is a sectional view illustrating a bearingless electric machine in the form of an electric generator; a temporary interconnection element according to an embodiment of the present invention being shown in an interconnection position where it interconnects the rotor and the stator of the electric machine.

A bearingless electric machine 10 according to an illustrative embodiment of the present invention will now be described first with reference to FIG. 1 of the appended drawings.

The bearingless electric machine 10 includes a casing 12, a stator 14 mounted to the casing 12 via fasteners 15, a rotor 16 and a temporary interconnection element 18 for temporary interconnecting the rotor 16 and the stator 14 as will be described hereinbelow in more detail.

As will be apparent to one skilled in the art, the electric machine 10 is of the type having an internal stator/external rotor. However, more conventional electric machines, having an internal rotor, could benefit from the general concept of the present invention.

The temporary interconnection element 18 is mounted to the casing 12 via six fasteners 20 (only two shown) and to the rotor 16 via five fasteners 22 (only three shown). Since the stator 14 is mounted to the casing via fasteners 15 (only one shown), the rotor 16 is indirectly connected to the stator 14 via the interconnection element 18. Even though the stator 14 is illustrated mounted to the casing via fasteners 15, other fastening means such as soldering, clamping, etc, can also be used.

The temporary interconnection element 18 will now be described in more detail with reference to FIG. 7.

The temporary interconnection element 18 is in the form of a generally ring-shaped body having a recessed central portion 24 and a peripheral flange 26 and defining a central aperture 28 and a central axis 29.

The recessed central portion 24 defines a first anchoring portion to be removably secured to the rotor 16. The first anchoring portion allows receiving fasteners via five fastener apertures 30 allowing the element 18 to be mounted to the rotor via fasteners 22 (see FIG. 1).

The recessed central portion 24 further comprises five larger apertures 32 for providing a passage extending through the element 18 for fastening the rotor 16 to an external element such as the rotatable shaft 38 (see FIG. 2) without removal, or even contact in the case of the present embodiment, of the interconnection element 18.

The peripheral flange 26, which is radially distanced from the central portion 24, defines a second anchoring portion to be removably secured to the stator 14 via the casing 12. More specifically, the peripheral flange 26 includes six slotted apertures 34 allowing the interconnection of the element 18 to the casing 12 via fasteners 20 (see FIG. 1).

Figure 2:
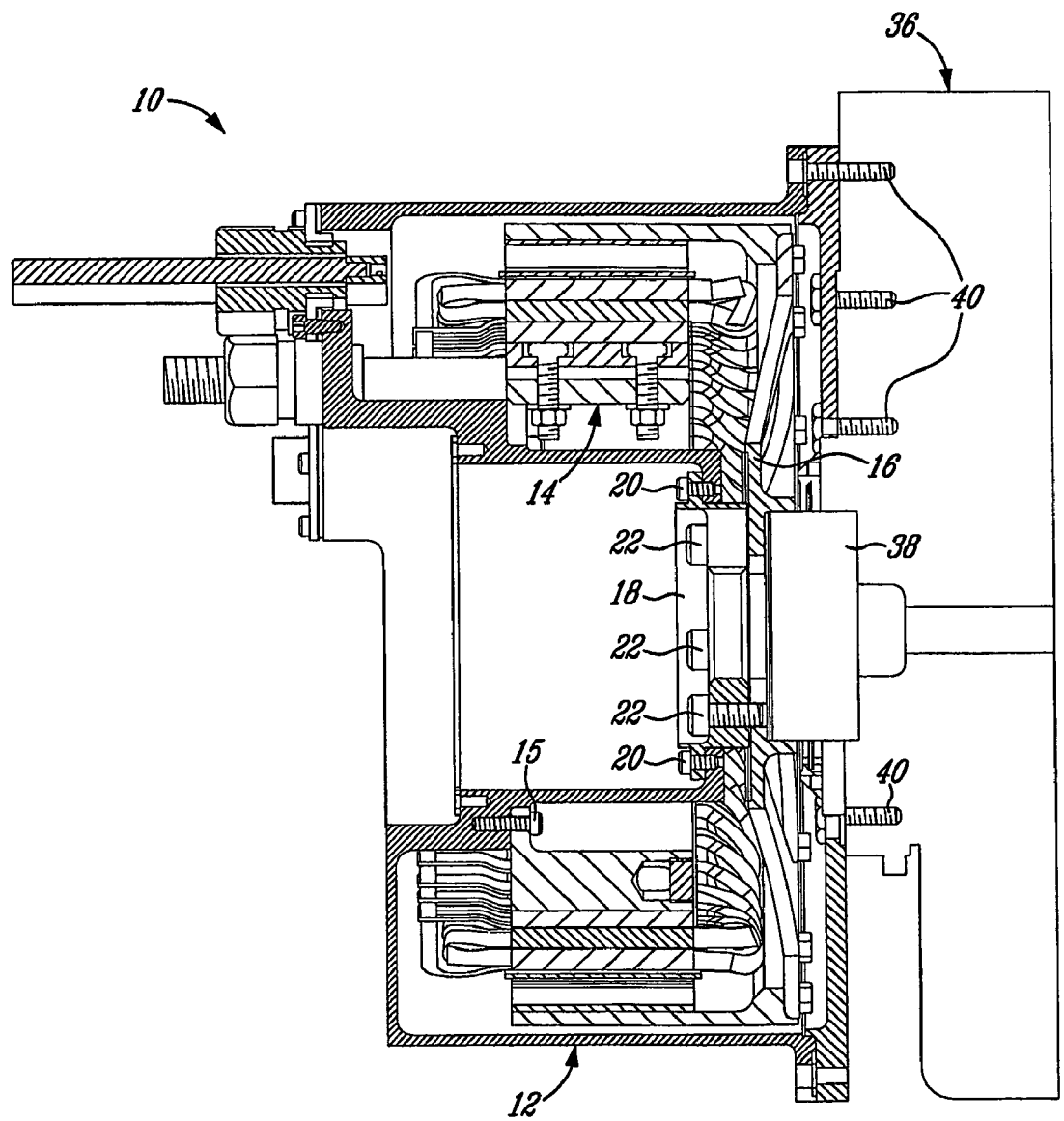
FIG. 2 is a sectional view similar to FIG. 1 illustrating the casing of the bearingless electric machine assembled to an ICE.

FIG. 2 of the appended drawings, illustrates the electric machine 10 mounted to an ICE 36 provided with a rotatable shaft 38 that is axially and radially fixed with respect to the remaining of the ICE 36. More specifically, the casing 12 of the machine 10 is secured to the ICE 36 via fasteners 40. It is to be noted that the rotor 16 of the machine 10 is not yet secured to the shaft 38.

Figure 3:
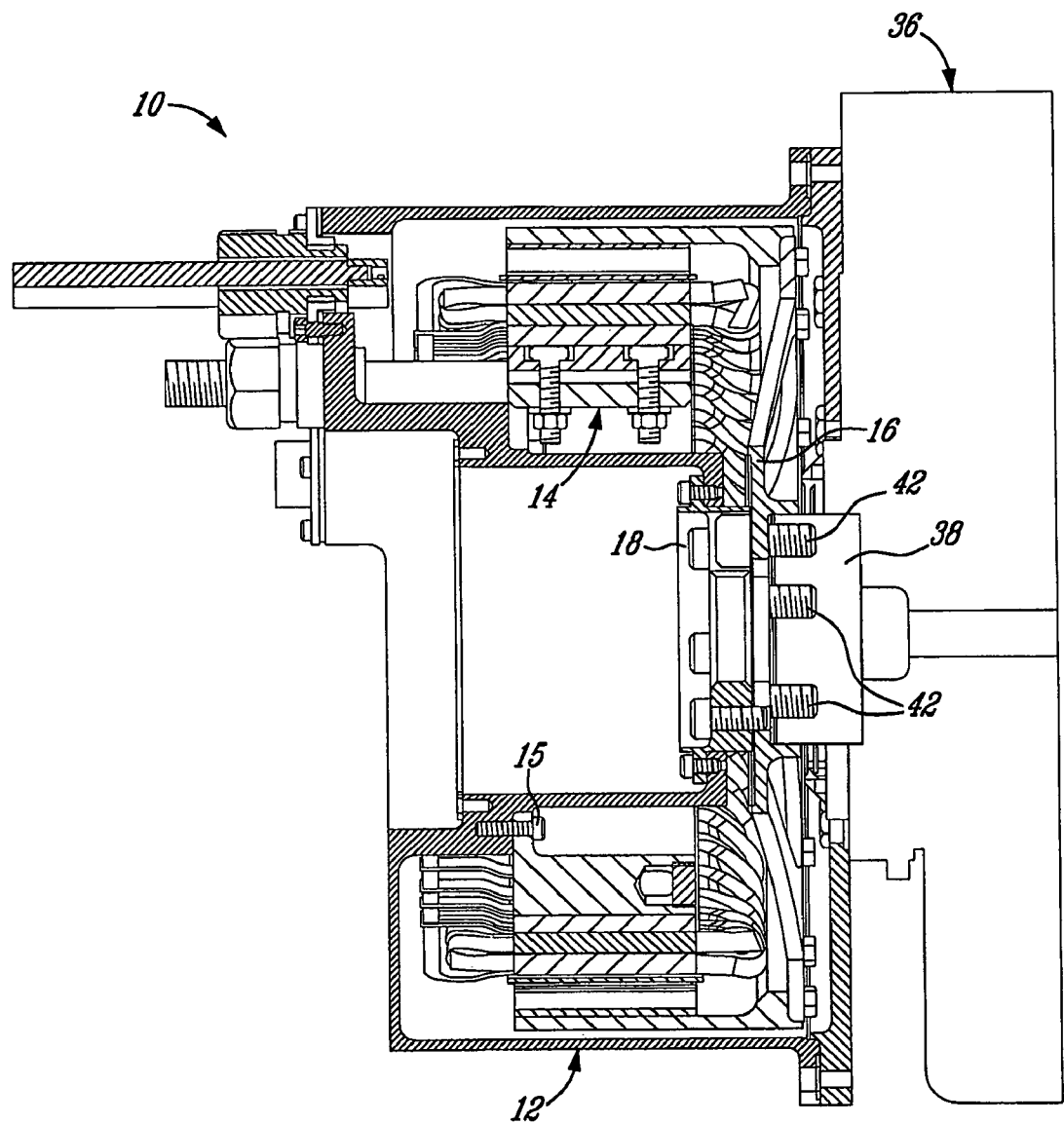
FIG. 3 is a sectional view similar to FIG. 2, where the rotor of the electric machine is mounted to the shaft of the ICE.

In FIG. 3, the rotor 16 is mounted to the shaft 38 via five fasteners 42 (only three shown) that pass through the larger apertures 32 of the element 18 (see FIG. 7). These fasteners 42 go through smaller apertures (not shown) of the rotor 16 and are secured to the shaft 38 via threaded apertures (not shown) of the shaft 38.

When this installation of the fasteners 42 is done, the element 18 is no longer required to maintain the integrity of the rotor 16 relatively to the stator 14 and may be removed from the electric machine 10. Indeed, since the rotor 16 is fixedly mounted to the shaft 38 and the stator 14 is fixedly mounted to the ICE 36 via the permanent interconnection of the stator 14 with respect to the casing 12, the spatial relationship between the rotor 16 and the stator 14 is maintained via the ICE 36.

Figure 4:
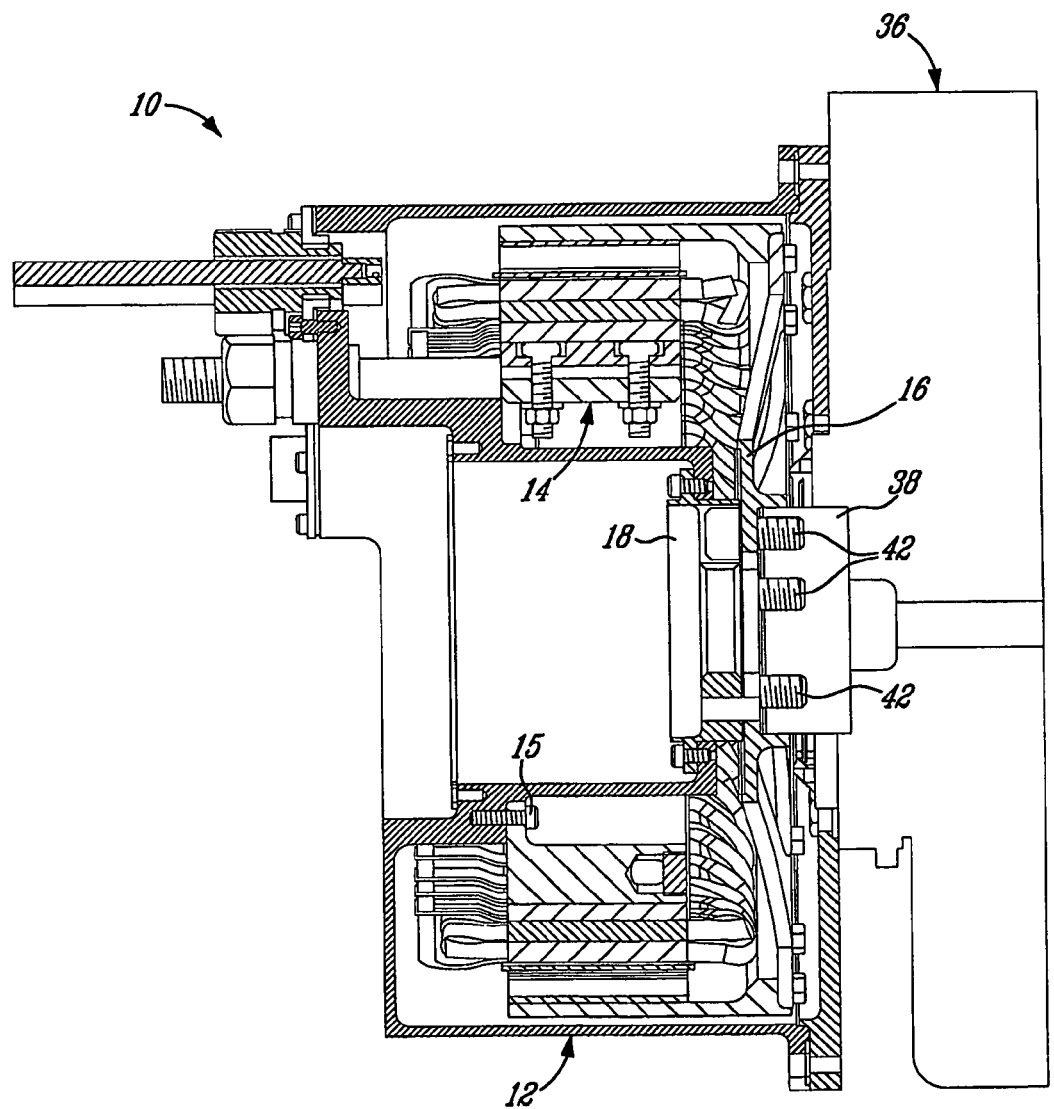
FIG. 4 is a sectional view similar to FIG. 2, where the temporary interconnection element is shown disconnected from the rotor but connected to the stator of the electric machine.

Accordingly, FIG. 4 illustrates the electric machine 10 where the fasteners 22 (FIG. 1) securing the temporary interconnection element 18 to the rotor 16 have been removed.

Figure 5:
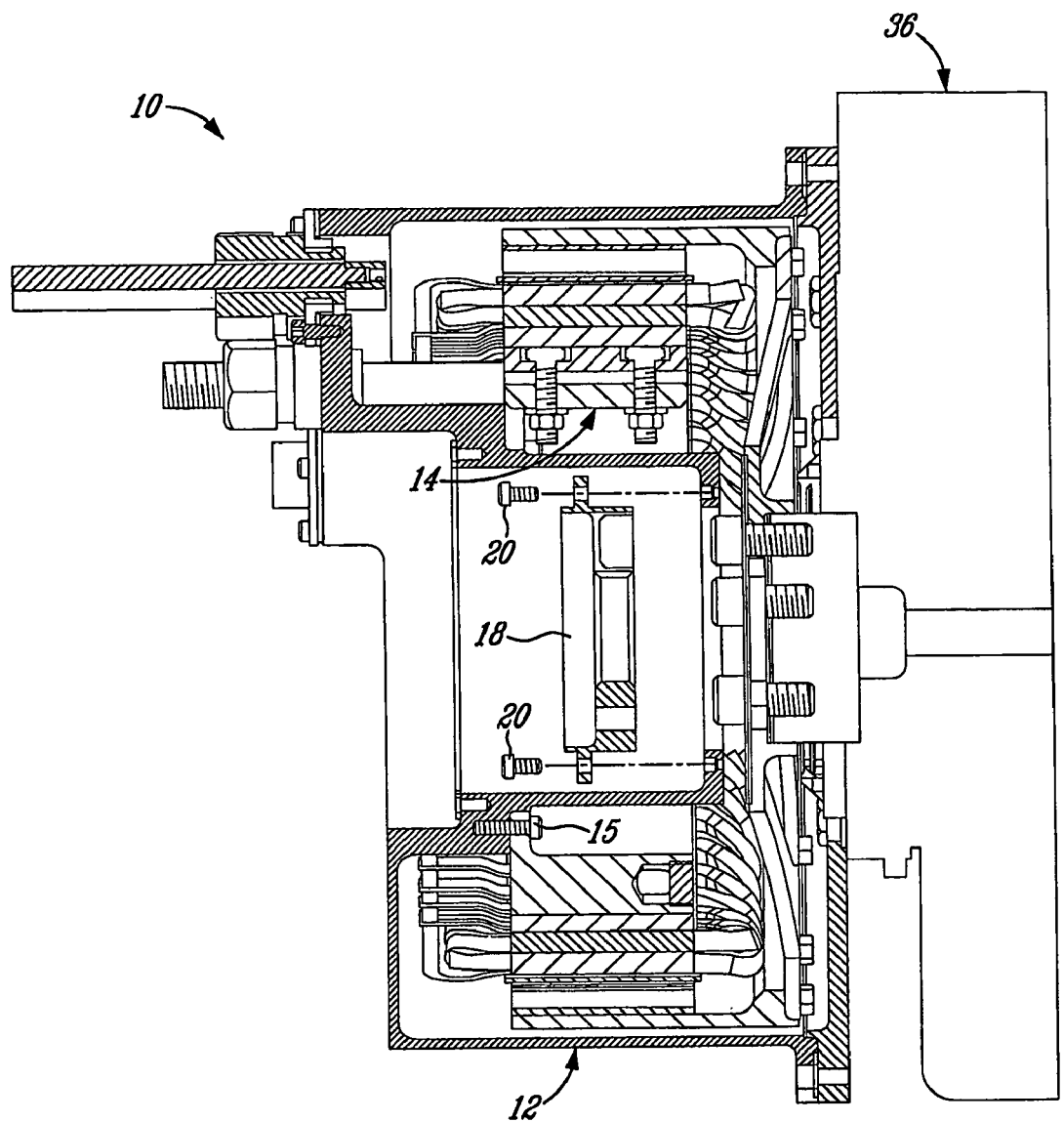
FIG. 5 is a sectional view similar to FIG. 2, where the temporary interconnection element is shown disconnected from the stator of the electric machine.

The element 18 may then be removed completely from the casing 12 via the removal of the fasteners 20, as can be seen from FIG. 5.

The temporary interconnection element 18 may then be stored or discarded since it is no longer required to maintain the spatial relationship between the rotor 16 and the stator 14, as long as the electric machine 10 is mounted to the ICE 36.

Figure 6:
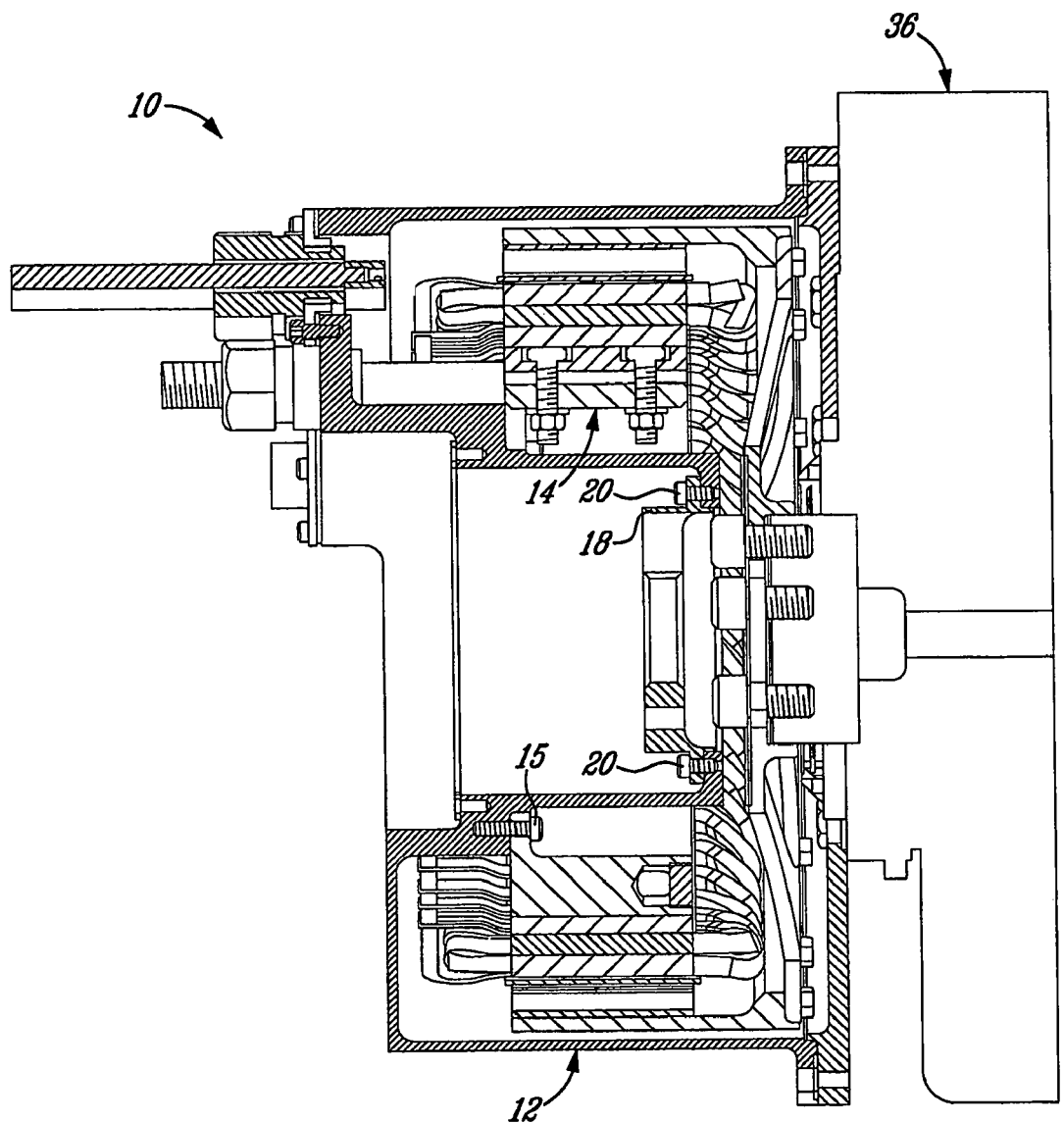
FIG. 6 is a sectional view similar to FIG. 2, where the temporary interconnection element is shown in its storage position, mounted to the stator of the electric machine.

Alternatively and optionally, as illustrated in FIG. 6, it is possible to store the element 18 directly into the stator 14 by flipping it and by securing it in its original place with the original fasteners 20. Indeed, since the central portion 24 of the element 18 is recessed (see FIG. 7), the element 18 does not contact the rotor 16 in any way when the element 18 is flipped around. The temporary interconnection element 18 is therefore said to be in its storage position. This is interesting since it ensures that the temporary interconnection element 18 will be available should it become necessary to remove the electric motor 10 from the ICE 36.

Even though the present invention has been described with reference to an electric machine 10 including a casing 12, the temporary interconnecting element 18 can be secured directly to the stator 14 via its second anchored portion 26.

Of course, one skilled in the art will understand that the dimension, number of apertures and overall shape of the element 18 illustrated herein are partly based on the operational requirements of the element 18 and partly based on the configuration of the rotor and stator of the electric machine and of the shaft of the ICE and may therefore differ without departing from the spirit and nature of the present invention.

For example, according to another embodiment (not shown) the slotted apertures may be replaced by round apertures. The peripheral flange 26 may extend at an angle from the central portion 24 so as to facilitate its securing to a casing or a stator having different geometries than those illustrated in FIGS. 1-6.

Also, depending on the configuration of the bearingless electric machine, the larger apertures 32, which provide a passage extending through the element 18 for fastening the rotor 16 to an external element, may be radially distanced from the apertures 30 for example.

Finally, since the central aperture 28 serves no anchoring or fastening purposes, it can alternatively be filled, yielding an interconnecting element having generally the shaped of a disc. Of course, the interconnecting element can have other shapes.

Although the present invention has been described hereinabove by way of preferred embodiments thereof, it can be modified, without departing from the spirit and nature of the subject invention as defined in the appended claims.

What is claimed is:

1. A bearingless electric machine, comprising:
    a stator;
    a rotor; and
    a removable interconnection element configured to temporarily interconnect the rotor and the stator; wherein the removable interconnection element has anchoring portions for allowing the rotor to be connected to an external assembly without requiring removal thereof.

2. The bearingless electric machine as recited in claim 1, wherein the anchoring portions of the interconnection element comprises:
    a first anchoring portion to be removably secured to the rotor;
    a second anchoring portion to be removably secured to the stator; and wherein the interconnection element includes:
    at least one passage extending through the element for fastening the rotor to the stator.

3. The bearingless electric machine as recited in claim 2, wherein at least one of the first and second anchoring portions includes at least one aperture to receive a fastener.

4. The bearingless electric machine as recited in claim 3, wherein the removable interconnection element is in the form of a disc-shaped body having a central axis.

5. The bearingless electric machine as recited in claim 4, wherein the disc-shaped body includes a recessed central portion defining one of the first and second anchoring portion.

6. The bearingless electric machine as recited in claim 5, wherein the recessed central portion includes the at least one passage.

7. The bearingless electric machine as recited in claim 6, wherein the at least one passage includes a plurality of passages disposed symmetrically about the central axis.

8. The bearingless electric machine as recited in claim 5, wherein at least one of the first and second anchoring portion includes at least one aperture to receive a fastener.

9. The bearingless electric machine as recited in claim 5, wherein the disc-shaped body further includes a peripheral flange defining the other of the first and second anchoring portions.

10. The bearingless electric machine as recited in claim 4, wherein the disc-shaped body includes a peripheral flange defining one of the first and second anchoring portions.

11. The bearingless electric machine as recited in claim 10, wherein at least one of the first and second anchoring portions includes at least one aperture to receive a fastener.

12. The bearingless electric machine as recited in claim 11, wherein the at least one aperture is a slotted aperture.

13. The bearingless electric machine as recited in claim 11, wherein the at least one aperture includes a plurality of slotted apertures disposed along the peripheral flange.

14. The bearingless electric machine as recited in claim 1, further comprising a casing for mounting the stator; the interconnection element being for temporary interconnecting the rotor and the stator via the casing.

15. The bearingless electric machine as recited in claim 14, wherein the stator is mounted to the casing via fastening means.

16. The bearingless electric machine as recited in claim 1, wherein the interconnection element includes first and second anchoring portions so configured as to be removably secured respectively to the rotor and to the stator.

17. The bearingless electric machine as recited in claim 1, wherein the interconnection element includes at least one passage for fastening the rotor to the external assembly.

18. The bearingless electric machine as recited in claim 1, wherein the external assembly includes an internal combustion engine.

19. The bearingless electric machine as recited in claim 1, wherein the bearingless electric machine has an internal stator and an external rotor coaxial therewith.

* * * * *